United States Patent [19]

Janowicz

[11] Patent Number: 5,028,677
[45] Date of Patent: Jul. 2, 1991

[54] NOVEL MACROMONOMER COMPOSITIONS

[75] Inventor: Andrew H. Janowicz, Wilmington, Del.

[73] Assignee: E. I. Du Pont de Nemours and Company, Wilmington, Del.

[21] Appl. No.: 314,201

[22] Filed: Feb. 23, 1989

Related U.S. Application Data

[63] Continuation of Ser. No. 113,928, Oct. 26, 1987, abandoned, which is a continuation-in-part of Ser. No. 910,589, Sep. 28, 1986, abandoned.

[51] Int. Cl.$^5$ .................. C08F 20/40; C08F 20/12
[52] U.S. Cl. ........................ 526/329.7; 526/273; 526/312; 526/320; 526/327; 560/205
[58] Field of Search .......... 526/273, 312, 287, 319, 526/320, 328.5, 327, 329.7, 341; 560/205, 211, 216, 218

[56] References Cited

U.S. PATENT DOCUMENTS

| | | |
|---|---|---|
| 4,265,796 | 5/1985 | Mueller-Mall et al. . |
| 4,526,945 | 7/1985 | Carlson et al. ................ 526/145 |
| 4,680,352 | 7/1987 | Janowicz et al. ............... 526/147 |
| 4,694,054 | 9/1987 | Janowicz ........................ 526/93 |
| 4,722,984 | 2/1988 | Janowicz ........................ 526/123 |
| 4,746,713 | 5/1988 | Janowicz ........................ 526/170 |
| 4,777,230 | 10/1988 | Kamath ........................... 526/86 |

FOREIGN PATENT DOCUMENTS

| | | |
|---|---|---|
| 0196783 | 2/1986 | European Pat. Off. . |
| 0199436 | 2/1986 | European Pat. Off. . |
| 8703605 | 6/1987 | PCT Int'l Appl. . |
| 1149961 | 4/1969 | United Kingdom . |

OTHER PUBLICATIONS

Smirnov et al., Dolk. Akad. Nauk SSSR, 255, 609–612 (1980) (translation provided).
Cacioli et al., J. Macromo., A23, 839–852 (1986).
Abbey et al., Proceedings of the ACS Division of Polymeric Matierals Science and Engineeering, 55, 235–238 (1986).
B. R. Smirnov et al., in Dokl. Akad. Nauk SSSR, 253, 891–895 (1980) (translation provided).
B. R. Smirnov et al., Dokl. Akad. Nauk SSSR, 254, 127–130 (1980) (translation provided).
B. R. Smirnov et al., Vysokomol. Soyed., A23, No. 11, 2588–2595 (1981).
Reprinted in Polymer Science, U.S.S.R., vol. 23, No. 11, 2807 (1981) (reprint provided).
D. E. Pashchenko et al., Dokl. Adad. Nauk SSSR, 265, 889–892 (1982) (Russian language version and translation provided).
A. F. Burczyk et al., J. Polym. Sci., Poly. Chem. Ed., vol. 22, 3255–3262 (1984).
A. F. Burczyk, Thesis to the University of Waterloo, Waterloo, Ontario (1984).
Rai et al., Indian Journal of Chemistry, vol. 18A, 242–246 (1979).
Uhlig et al., Z. anorg. allg. Chem., 343, 299 (1966) (translation provided).
Schrauzer, Inorg. Syn., 11, 61–69 (1968).
A. Bakac et al., J. Am. Chem. Soc., 106, 5197–5202 (1984).
Bremer et al., J. prakt. Chem., 323 857–863 (1981) (German language version with English abstract provided).
McCarthy et al., J. Am. Chem. Soc., 77, 5820–5824 (1955).
Cacioli et al., Polymer Bulletin, 11, 325–328 (1984).
N. S. Enikolopyan et al., J. Polym. Sci., Polym. Chem. Ed., vol. 19, 879–889 (1981).
B. R. Smirnov et al., in Vysokomol, soyed., A23, No. 5, 1042–1050 (1981).
Reprinted in Polymer Science U.S.S.R., vol. 23, No. 5, 1158 (1981) (Reprint Provided).

*Primary Examiner*—Christopher Henderson

[57] ABSTRACT

Novel compositions of homopolymers and copolymers containing an olefinic polymerizable end group wherein the monomeric units comprise methacrylate, acrylate, acrylic acid, styrene, vinyl esters, acrylonitrile, methacrylonitrile, vinyl halides, vinylidene halides, substituted butadienes, ethylene-sulfonic acid derivatives, acrylamide derivatives, methacrylamide derivatives, and other monomers, and mixtures thereof are disclosed.

8 Claims, No Drawings

NOVEL MACROMONOMER COMPOSITIONS

This application is a continuation of U.S. patent application Ser. No. 113,928, filed Oct. 26, 1987 now abandoned, which was a continuation-in-part of U.S. patent application Ser. No. 910,589, filed Sept. 23, 1986, now abandoned.

BACKGROUND OF THE INVENTION

1. Field of the Invention

This invention relates to novel compositions of homopolymers and copolymers containing an olefinic polymerizable end group wherein the monomeric units comprise methacrylate, acrylate, styrene, vinyl esters, acrylonitrile, methacrylonitrile, vinyl halides, vinylidene halides, substituted butadienes, ethylenesulfonic acid derivatives, acrylamide derivatives, methacrylamide derivatives, and other monomers, and mixtures thereof.

2. Background

Macromonomers, that is, polymers containing an olefinic polymerizable end group, are known in the art. For example, Smirnov et al., Dokl. Akad. Nauk USSR, 255, 609–612 (1980) discuss the production of polymers having a terminal olefinic group using cobalt complexes of porphyrins as a catalytic chain transfer agent. Cacioli et al. J. Macromol., A23, 839–852 (1986) describe the preparation, using Co(II) tetraphenylporphyrin as catalyst, of methyl methacrylate oligomers of various number-average molecular weights having terminal double bonds and describe the usefulness of such macromonomers in the production of graft polymers. Abbey et al., Proceedings of the ACS Division of Polymeric Materials Science and Engineering, 55, 235–238 (1986) discuss terminal olefinic polymers produced using a cobaloxime chain transfer agent. The authors state that the dimer can be isolated at 99% purity.

Using present art processes, however, the percentage of macromonomers obtained is often very low, and is always less than about 80 mol %. Moreover, using current methods, isolation of macromonomers of greater than about 2 or 3 monomer units from terminally saturated non-polymerizable polymers which are also generated by such processes is not possible.

Novel compositions containing a higher percentage of macromonomer are needed in order to permit more effective utilization of these compounds in the production of graft polymers and other polymeric moieties.

SUMMARY OF THE INVENTION

The present invention provides a novel macromonomer composition comprising at least about 80 mol % of a macromonomer having:

(I) an end group of the formula $$C(X_1)(X_2)=C(X_3)(CH_2)_n; \text{ and}$$

(II) at least 50 and up to about 10,000 monomeric units linked to the end group, said units being independently selected from a compound of the formula

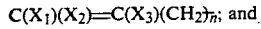

wherein:

n is 0 or 1;

$X_1$ and $X_2$ independently are H or a polar or nonpolar substitutent that is inert under polymerizing conditions, provided that when n is 0, at least one is not H and provided that when n is 1, both are H;

$X_3$ is H or a polar or nonpolar substituent that is inert under polymerizing conditions, provided that when n is O, $X_3$ is H;

m is 0 or 1;

$R_1$, $R_2$ and $R_3$, independently, are H or a polar or nonpolar substituent that is inert under polymerizing conditions;

$R_4$ and $R_5$, independently, are H or a polar or nonpolar substituent that is inert under polymerizing conditions, provided that where m is 0, at least one is not H; provided that:

each monomeric unit has polymerizing compatability with any adjacent monomeric unit.

The present invention also provides a novel macromonomer composition comprising at least about 80 mol % of a macromonomer having:

(I) an end group of the formula $$C(X_1)(X_2)=C(X_3)(CH_2)_n; \text{ and}$$

(II) at least 3 and up to about 10,000 monomeric units linked to the end group, said units being independently selected from a compound of the

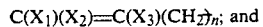

wherein:

n is 0 or 1;

$X_1$ and $X_2$ independently are H or a polar or nonpolar substitutent that is inert under polymerizing conditions, provided that when n is 0, at least one is not H and provided that when n is 1, both are H;

$X_3$ is H or a polar or nonpolar substituent that is inert under polymerizing conditions, provided that when n is O, $X_3$ is H;

m is 0 or 1;

$R_1$, $R_2$ and $R_3$, independently, are H or a polar or nonpolar substituent that is inert under polymerizing conditions;

$R_4$ and $R_5$, independently, are H or a polar or nonpolar substituent that is inert under polymerizing conditions, provided that where m is 0, at least one is not H; provided that:

(a) each monomeric unit has polymerizing compatability with any adjacent monomeric unit;

(b) the macromonomer has at least 50 monomeric units linked to the end group when each n is 1, each $X_1$ and $X_2$ are H, each $X_3$ is $CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to 2x+1, $R_6R_7N(CH_2)_z$ where $R_6$ and $R_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10, each m is 0, each $R_1$ is H, and each $R_4$ and $R_5$ are $CH_3$ and $CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to 2x+1, $R_6R_7N(CH_2)_z$ where $R_6$ and $r_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10, provided that when $R_4$ is $CO_2J$ $R_5$ is $CH_3$ and when $R_5$ is $CO_2J$ $R_4$ is $CH_3$, that is, the macromonomer is a homomacromonomer of methacrylate; and (c) the macromonomer has at least 50 monomeric units linked to the end group
when
substantially all of the monomeric units in the macromonomer are selected from at least two of the following monomeric units (i) where
m is 0,
$R_1$ is H,
$R_4$ and $R_5$ are $CH_3$ and $CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to $2x+1$, $R_6R_7N(CH_2)_z$ where $R_6$ and $R_7$ are independently $C_1$ to $C_{12}$ alkyl and Z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10, provided that when $R_4$ is $CO_2J$ $R_5$ is $CH_3$ and when $R_5$ is $Co_2J$ $R_4$ is $CH_3$,
that is, methacrylate monomeric units;

(ii) where
m is 0,
$R_1$ is H,
$R_4$ and $R_5$ are $CH_3$ and CN, provided that when $R_4$ is $CH_3$ $R_5$ is Cn and when $R_5$ is $CH_3$ $R_4$ is CN, that is, methacrylonitrile monomeric units; and (iii) where
m is 0,
$R_1$ is H,
$R_4$ and $R_5$ are H and $C_6H_5$, provided that when $R_4$ is H, $R_5$ is $C_6H_5$ and when $R_5$ is H $R_4$ is $C_6H_5$, that is, styrene monomeric units.

Preferred for reasons of commercial applicability and/or ease of synthesis are macromonomer compositions of the above formulas wherein the macromonomer is a homomacromonomer of methacrylates, that is, each n is 1,
each $X_1$ and $X_2$ are H,
each $X_3$ is $CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to $2x+1$, $R_6R_7N(CH_2)_z$ where $R_6$ and $R_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10,
each m is 0,
each $R_1$ is H, and
each $R_4$ and $R_5$ are $CH_3$ and $CO_2J$ wherein J is H, $C_1$-$C_{12}$ alkyl, $C_2$-$C_{12}$ akenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to $2x+1$, $R_6R_7N(CH_2)_z$ where $R_6$ and $R_7$are independnetly $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10, provided that when $R_4$ is $CO_2J$ $R_5$ is $CH_3$ and when $R_5$ is $CO_2J$ $R_4$ is $CH_3$.

DETAILED DESCRIPTION OF THE INVENTION

This invention resides in novel compositions of homopolymers and copolymers containing an olefinic polymerizable end group. The term "macromonomer" is used herein to describe such terminal olefinic moieties. More specifically, the term "homomacromonomers" is used to describe homopolymers having a terminal double bond, and similarily, the term "comacromonomers" is used to describes copolymers with that end group.

The macromonomers of the present invention consist of an end group of the formula $C(X_1)(X_2)=(X_3)(CH_2)_n$ and up to about 10,000 monomeric units linked to the end group, the units being independently selected from a compound of the formula $+CHR_1(CR_2=CR_3)_mC(R_4)(R_5)+$. In a first embodiment, the invention contemplates that the macromomomer have at least 50 monomeric units. Thus the number of monomeric units in the macromonomers of the first embodiment could be 50, 51, 52, 53, 54, 55, 56, 57, etc., up to about 10,000, and any ranges or combinations therebetween. In a second embodiment, the invention contemplates that the macromonomer have at least 3 monomeric units. Thus the number of monomeric units in the macromonomers of the second embodiment could be 3, 4, 5, 6, 7, 8, 9, 10, etc., up to about 10,000, and any ranges or combinations therebetween. Preferred in the first embodiment for reasons of commercial applicability and/or ease of synthesis are macromonomers having at least 50 and up to about 1,000 monomeric units. Preferred in the second embodiment for reasons of commercial applicability and/or ease of synthesis are macromonomers having at least 10 and up to about 1,000 monomeric units. Most preferred in either embodiment are macromonomers having at least 100 and up to about 500 monomeric units.

As noted above, groups $X_1$, $X_2$, $X_3$, $R_1$, $R_2$, $R_3$, $R_4$ and $R_5$ are defined, with certain qualifications, as being H or a polar or nonpolar substituent that is inert under polymerizing conditions. By "polar or nonpolar substituent that is inert under polymerizing conditions", it is meant a substituent such as, but not limited to, phenyl, carboxylate, acetate, cyano, chloride, fluoride, sulfonate, organic amide, keto derivative, itaconic derivative, and itaconic anhydride. Polar and nonpolar substituents which would not be inert under polymerizing conditions and thus could not be substituents include acid chlorides in the presence of water and a mixture of groups of acids or amines.

The mono units thus may comprise, but are not limited to, methacrylates of the formula $CH_3=C(CH_3)CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to $2x+1$, $R_6R_7(CH_2)_z$ where $R_6$ and $R_7$ are independently $C_1$ to $C_{12}$ alkyl and z is 1 and z is 1 to 10, or $R_8R_9R_{10}Si(CH_2)_z$ where $r_8$, $R_9$ and $R_{10}$ are independently $C_1$ to $C_{12}$ alkyl or $C_1$ to $C_{12}$ alkoxy and z is 1 to 10, acrylates of the formula $CH_2=CHCO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{2x+1-y}F_y$ where x is 1 to 16 and y is 0 to $2x+1$, $R_6R_7N(CH_2)_z$ where $R_6$ and $R_7$are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10, styrenes substituted or unsubstituted on the phenyl ring, acrylonitrile, methacrylonitrile, maleic anhydride, fumarate derivatives such as fumaronitrile, dialkylfumarate and fumaric acid, vinyl halides of the formula $CH_2=CHX$ wherein X is Cl or F, vinylidene halides of the formula $CH_2=C(X)_2$ wherein each X is independently Cl or F, substituted butadienes of the formula $CH_2=C(R)C(R)=CH_2$ wherein each R is independently H, $C_1$ to $C_{10}$ alkyl, Cl or F, ethylenesulfonic acid derivatives of the formula $CH_2=CHSO_3X$ wherein X is Na, K, Li, $N(R)_4$, H, R or $(CH_2)_n Z$ where n is an integer from 1 to 10, Z is COOY, OH, $N(R)_2$, or $SO_3Y$, Y is H, Li, Na, K or N(R) and each R is independently $C_1$ to $C_{10}$ alkyl, acrylamide derivatives of the formula $CH_2=CHCON(R)_2$ wherein each R is independently H, $C_1$ to $C_{10}$ alkyl, or $(CH_2)_nZ$, n is an integer from 1 to 10, Z is COOY, OH, $N(R_1)_2$ or $SO_3Y$ and Y is H, Li, Na, K or $N(R_1)_4$ where R is $C_1$ to $C_{10}$ alkyl, methacrylamide derivatives of the formula $CH_2=C(CH_3)CON(R)_2$ wherein R is H, $C_1$ to $C_{10}$ alkyl or $(CH_2) Z$, n is an integer from 1 to 10, Z is COOY, OH, $N(R_1)_2$, $SO_3Y$ and Y is H, Li, Na, K, or $N(R_1)_4$ where $R_1$ $CH_2=CHOOCR$, CR, wherein R is $C_1$ to $C_{10}$ alkyl, and any and all monomer mixtures thereof.

The methacrylates and acrylates described above would thus include branched alkyl or n-alkyl esters of $C_1-C_{12}$ alcohols (for example, methyl and ethyl methacrylate and acrylate), methacrylic and acrylic acid, and allyl, glycidyl, hydroxyalkyl (for example, hydroxyethyl and hydroxypropyl), allyloxyethyl, 2,4-hexadienyl (sorbyl), dialkylaminoalkyl, fluoroalkyl, and trialkylsilylalkylene methacrylates and acrylates.

Of the contemplated monomeric units, preferred for reasons of commerical applicability and/or ease of synthesis are the methacrylates.

As one skilled in the art would recognize, however, each monomeric unit must have polymerizing compatability with any adjacent monomeric units. "Polymerizing compatability", as used herein, is determined by taking into account the steric and electronic properties of particular monomers. The polymerizing compatability of various monomers is well-documented in the art. See, e.g., Young, L. H., "Copolymerization Reactivity Ratios" in Polymer Handbook, J. Brandrup and E. H. Immergut, eds., John Wiley & Sons, Inc. (1975). For example, α-methyl styrene does not have polymerizing compatablility with itself in free radical polymerizations above 60° C. and therefore cannot form homopolymers under these conditions. Thus, in the macromonomer, α-methyl styrene may not occur adjacent to another α-methyl styrene under such reaction conditions. Also, maleic anhydride, fumaronitrile, dialkyl fumarate and fumaric acid do not have any polymerizing compatability with themselves or with each other via free radical polymerization. Thus, for example, in the macromonomer maleic anhydride may not occur adjacent to another maleic anhydride, fumaronitrile, dialkyl fumarate or fumaric acid.

The concentration of macromonomers in the claimed polymeric composition is at least about 80 mol %. Contemplated thus are concentrations of at least about 80 mol %, at least aboul 85 mol %, at least about 90 mol %, at least about 95 mol %, and any and all concentrations and ranges of concentrations therebetween, and up to 100 mol %.

In the second embodiment, the macromonomer must have at least 50 monomeric units linked to the end group when substantially all of the monomeric units in the macromonomer are selected from at least two of the following monomeric units:
(i) monomeric units of methacrylates;
(ii) monomeric units of methacrylonitrile; and
(iii) monomeric units of styrene.

Thus, where the macromonomer is a comacromonomer having substantially all of the monomeric units chosen from any combination of the methacrylates, methacrylonitrile and styrene, the macromonomer must have at least 50 monomeric units. By "substantially", as used here, it is meant 98% or greater. Thus, as used in the above context, the phrase "substantially all" denotes the situation where 98% or greater of all of the monomeric units are selected from at least two of (i) the methacrylates, (ii) methacrylonitrile or (iii) styrene.

Also in the second embodiment, the macromonomer must have at least 50 monomeric units linked to the end group, when the macromonomer is a homomacromonomer of methacrylates.

The macromonomer compositions of the present invention can be prepared by polymerization processes employing specific cobalt(II) chelates as catalytic chain transfer agents. The cobalt(II) chelates utilized are not only effective in controlling the molecular weights of the homopolymers and copolymers produced, but also act to produce a polymer composition containing a percentage of macromonomers not heretofore known.

The cobalt chelates utilized to produce the macromonomer composition consist of cobalt(II) coordinated to the following ligands: vicinal iminohydroxyimino and dihydroxyimino compounds (I), and diazadihydroxyiminodialkyldecadienes and -undecadienes (II). By "ligand", as the term is used herein, is meant any atom, radical or molecule which can bind to a characteristic or central element of a complex. The structures of the aforesaid ligands are given below.

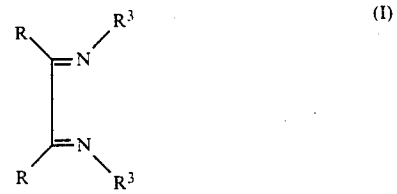

(I)

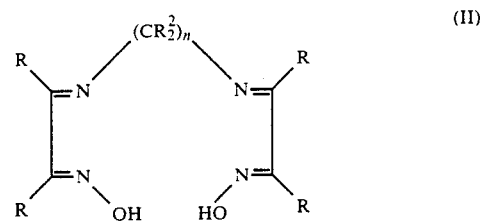

(II)

In the aforesaid formulas each R, independently, is phenyl or $C_1$ to $C_{12}$ alkyl wherein each α-carbon atom contains two hydrogen atoms, that is, is unsubstituted, and R and R on adjacent carbon atoms, taken together, is $C_5$ to $C_8$ cycloalkylene, unsubstituted in the α-positions, —CH=CH —CH=CH—,

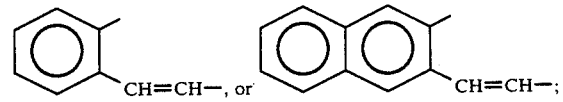

$R^2$ is H or $C_xH_{2x+1}$ wherein x is 1 to 12; each $R^3$, independently, is H, $C_xH_{2x+1}$ wherein x is 1 to 12, or OH, with at least one being OH; and n is 2 or 3. The corresponding structures for the cobalt chelates of these ligands are given below. More specifically, the corresponding cobalt chelate of structure I is III, and the corresponding cobalt chelate of structure II is IV.

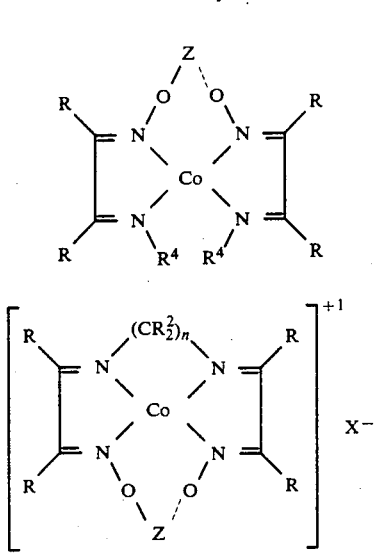

In formulas III and IV, R, $R^2$ and n are as defined above; each $R^4$, independently, is H or $C_xH_{2x+1}$ wherein X is 1 to 12, or both $R^4$ groups taken together is —O—Z—O—; Z is $BF_2$, $BCl_2$, $BBr_2$ or $BR_2^2$; and $X^-$ is $NO_3^-$, $Cl^-$, $Br^-$, $I^-$, $BF_4^-$, $PF_6^-$, $SbF_6^-$ or $R^1COO^-$ wherein $R^1$ is $C_1$ to $C_{12}$ alkyl. The cobalt chelates of the above formulas may also, but need not, be coordinated with additional ligands derived from materials present in the reaction medium such as water, alcohols or ketones.

Preparation of iminohydroxyimino compounds, dihydroxyimino compounds, diazadihydroxyiminodialkyldecadienes and diazadihydroxyiminodialkylundecadienes, and cobalt chelate catalytic chain transfer agents of Formulas III and IV from such iminohydroxyimino compounds, dihydroxyimino compounds, diazadihydroxyiminodialkyldecadienes and diazadihydroxyiminodialkylundecadienes can be accomplished using methods known in the art, such as those set forth in H. C. Rai et al., Indian Journal of Chemistry, Vol. 18A, 242 (1979), E. Uhlig et al., Z. anorg. allg. Chem., 343, 299 (1966), G. N. Schrauzer, Inorg. Syn., 11, 62 (1968), and A. Bakac et al., J. Am. Chem. Soc., 106, 5197 (1984).

The preferred chain transfer agents herein are cobalt-(II) salts coordinated to the ligands of Formula I wherein both $R^4$ groups taken together is —O—Z—O—. Most preferred are Co(II)(2,3-dioxyiminobutane-$BF_2$)$_2$, Co(II)(1,2-dioxyiminocyclohexane-$BF_2$)$_2$, and Co(II)(1,2-diphenyl-1,2-dioxyiminoethane-$BF_2$)$_2$.

The cobalt catalyst can be employed in concentrations of between $1 \times 10^{-8}$M and $1 \times 10^{-3}$ to obtain the desired percentages of macromonomers, however the optimum concentration is dependent upon the particular monomer or monomers used and the particular concentration of macromonomer desired. For example, 1,1-substituted monomers would require less catalyst 1-substituted monomers within a given system. The concentration of macromonomer increases with the concentration of cobalt catalyst employed.

The polymerization can be carried out either in the absence of a polymerization medium, as a bulk polymerization, or alternatively, in the presence of a polymerization medium, as a solution, suspension or emulsion polymerization. Preferred for greater yield of macromonomer is emulsion polymerization.

Many common organic solvents are suitable as solution polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols; alkyl esters of acetic, propionic and butyric acids; mixed ester-ethers, such as monoalkyl ether-monoalkanoate esters of ethylene glycol; and amides such as formamides and acid amides. In addition, ketones, such as acetone, butanone, pentanone and hexanone, are suitable, as are alcohols, such as methanol, ethanol, propanol and butanol. Water may be used as a solvent for water soluble monomers. In some instances, it may be advantageous to use mixtures of two or more solvents.

In emulsion and suspension polymerizations, the suitable medium is water in combination with any conventional suspending or emulsifying agent. Emulsifying agents can be anionic such as sodium dodecylsulfate or cationic such as hexadecyltrimethylammonium bromide. The suspending agent used in the reaction can be Acrysol A-3, a polyacrylic acid made by Rohm & Haas Company.

The bulk and solution polymerizations can be carried out at 50°–150° C., with the preferred range 80°–110° C. The emulsion and suspension polymerizations can be carried out at 25°–90° C., with the preferred range 65°–80° C.

Any of the known class of azo polymerization initiators is suitable provided it has solubility in the solvent, monomer mixture, or water, as the case may be, and has an appropriate half life at the temperature of polymerization. "Appropriate half life", as used herein, is a half life of about 1–4 hours. Typical of such initiators, but not restricted to them, are azocumene, 2,2′-azobis-(isobutyronitrile), 2,2′-azobis(2-methyl)butanenitrile, 4,4′-azobis(40-cyanovaleric acid), and 2-(t-butylazo)-2-cyanopropane. Other soluble non-azo initiators having an appropriate half life may also be used, including, among others, benzoyl peroxide, lauroyl peroxide, persulfates, and molecular hydrogen.

The process can be carried out as a batch or feed process. In either type of process the polymer is isolated by stripping off solvent and unreacted monomer or by precipitation with a nonsolvent. Alternatively, the polymer solution may be used as such if appropriate to its application.

To ensure maximum catalyst activity the polymerizations should be carried out in the substantial absence of oxygen under an inert atmosphere, such as nitrogen, argon or other non-oxidizing gas. "Deaeration", as the term is used herein, means the substantial removal of oxygen.

The invention is further described in the Examples set forth below. The polymerizations discussed therein were conducted substantially according to the following General Procedures, except where otherwise indicated. In the General Procedures and Examples, all parts are by moles, and all temperatures are given in degrees Celsius, unless otherwise stated.

GENERAL POLYMERIZATION PROCEDURES

A. Solution Polymerization

In a nitrogen drybox, 21.4 ml (0.2 mol) of methyl methacrylate, which had been previously sparged with nitrogen and passed through a column of Woelm alumina (grade 1), was added to a 100 ml volumetric flask. To this was added the desired amount of cobalt catalyst and the volume was brought to 100 ml with distilled methanol.

To a 300 ml round bottom flask were added 0.062 g ($2.5 \times 10^{-4}$ mol) of 2,2-azobis(2-methyl)butanenitrile and the contents of the volumetric flask. The reaction mixture was then stirred to dissolve the 2,2'-azobis(2-methyl)butanenitrile and a gas chromatography (GC) sample was taken. The round bottom flask was capped with a water cooled condenser, brought out of the drybox and heated to reflux under nitrogen for six hours. The reaction mixture was then allowed to cool to room temperature and a second GC sample was taken. The poly(methyl methacrylate) which was produced was isolated by removing solvent and monomer from the reaction mixture via a rotary evaporator. In some of the examples which follow, thermal gravimetric analysis (TGA) was used to determine the percentage of unsaturated end groups in the polymeric composition. The procedures for TGA are set forth in Cacioli et al., Polymer Bulletin, 11, 325–328 (1984), and the TGA data is expressed as % unsaturated end group. The accuracy of TGA is believed to be within ±3-5 %, with accuracy better at the higher TGA percent unsaturation ranges. Gel permeation chromatography (GPC) was used to determine the average molecular weight ($\overline{M}_w$) and average molecular number ($\overline{M}_n$) of the polymer produced. It should be noted that where values are less than 1000, molecular weight is difficult to determine with accuracy. Nevertheless, the decrease in molecular weight shown by these values is an accurate reflection of molecular weight control. The effectiveness of a catalytic chain transfer agent to control molecular weight correlates with the amount of macromonomer produced. Thus, the effective molecular weight control in the presence of small catalyst amounts shown in Examples 1-27 indicates the presence of a high percentage of macromonomers in the resultant polymer composition.

B. Emulsion Polymerization

In a nitrogen dry box, 21.4 ml (0.2 mole) of methyl methacrylate, previously sparged with nitrogen and passed through a column of Woelm alumina (grade 1), 0.374 g 4,4'azobis(4-cyanovaleric acid) and the desired amount of cobalt catalyst were placed into a 300 ml three neck round bottom flask equipped with a reflux condenser, septum, and mechanical stirrer. The flask was brought out of the dry box and 60 ml of 0.1M aqueous sodium dodecylsulfate (degassed) was added under an atmosphere of nitrogen. The flask was placed in a bath at 80° C., the stirrer set at 400 rpm and the reaction allowed to proceed for four hours. A nitrogen atmosphere was maintained in the flask throughout the course of the reaction. After the allotted time, the reaction mixture was cooled to room temperature and the polymer precipitated by adding 150 ml of methanol. The polymer was collected by filtration, washed with methanol, washed with water, and air dried. The data was collected as described above.

EXAMPLES 1-2

A. Preparation of [CO(II)(DHIB-BF$_2$)$_2$(H$_2$O)$_2$]

[DHIB = 2,3 dioxyiminobutane]

The title compound was prepared by the method fo A. Babac et al., J. Am. Chem. Soc., 106, 5197–5202 (1984).

The suspension resulting from the addition of 10 ml of BF$_3$.Et$_2$O to 2 g of Co(OAc)$_2$.4H$_2$O and 1.9 g of 2,3-dihydroxyiminobutane in 150 ml of diethyl ether was stirred at room temperature overnight. The resultant solid [Co(II)(DHIB-BF$_2$)$_2$(H$_2$O$_2$] was collected by filtration, placed into 250 ml of methanol and heated to reflux. The solid which did not dissolve was removed by filtration (0.336 g). The remaining clear solution was placed in a freezer overnight. The crystallized product was recovered by filtration and dried (0.468 g). The remaining solution was reduced to a volume of 30 ml under vacuum and placed in a freezer (−25° C.) overnight. An additional 0.101 g of product was recovered. The infrared spectra of the product exhibited bands at 3581 cm$^{-1}$ (H$_2$O) and 1623 cm$^{-1}$, 950 cm$^{-1}$ (BF).

B Use of [Co(II)(DHIB-BF$_2$)$_2$(H$_2$O) as a Catalytic Chain Transfer Agent in the Free Radical Solution Polymerization of Methyl Methacrylate The General Procedure for solution polymerization was followed using the indicated amount of Co(II)(DHIB-BF$_2$)$_2$(H$_2$O) as catalyst. The results are listed below.

| Example | Catalyst | $\overline{M}n$ | $\overline{M}w$ | $\overline{M}w/\overline{M}n$ | TGA |
|---|---|---|---|---|---|
| 1 | $5.0 \times 10^{-6}$M | 2120 | 4790 | 2.26 | 89% |
| 2 | $5.0 \times 10^{-6}$M | 1930 | 3860 | 2.00 | 89% |

A repeat of the above experiment with no catalyst gave $\overline{M}n$ 45,800, $\overline{M}w$ 122,000 and $\overline{M}w/\overline{M}n$ 2.66.

COMPARATIVE EXAMPLES A-D

Attempted Use of Co(II)(DHIB-H)$_2$(H$_2$O)$_2$ as Catalytic Chain Transfer Agents in the Free Radical Soltuion Polymerization of Methyl Methacrylate The General Procedure for solution polymerization was followed using the indicated amount of Co(II)(D-HIB-H)$_2$(H$_2$O)$_2$ as catalyst. The results are listed below.

| Example | Catalyst | $\overline{M}n$ | $\overline{M}w$ | $\overline{M}w/\overline{M}n$ | TGA |
|---|---|---|---|---|---|
| A | $5.0 \times 10^{-6}$M | 44,300 | 101,000 | 2.27 | 55% |
| B | $6.0 \times 10^{-6}$M | 41,400 | 107,000 | 2.58 | 53% |
| C | $6.0 \times 10^{-6}$M | 29,700 | 65,200 | 2.19 | 60% |
| D | $1.0 \times 10^{-5}$M | 19,000 | 48,600 | 2.56 | 72% |

A repeat of the above experiment with no catalyst gave $\overline{M}n$ 45,800, $\overline{M}w$ 122,000 and $\overline{M}w/\overline{M}n$ 2.66 and TGA 52%.

EXAMPLE 3

The Use of Co(II)(DHIB-BF$_2$(H$_2$O)$_2$ as a Catalytic Chain Transfer Agent in the Free Radical Solution Polymerization of Methyl Methacrylate The General Procedure for solution polymerization was followed using the indicated amount of Co(II)(D-HIB-BF$_2$)$_2$(H$_2$O)$_2$ as catalyst, methyl methacrylate as monomer, 2,2'-azobis(isobutyronitrile) as initiator, and methyl ethyl ketone as solvent. The cobalt catalyst was prepared according to the procedure described in Examples 1-2. The results are listed below.

| Example | Catalyst | $\overline{M}n$ | $\overline{M}w$ | $\overline{M}w/\overline{M}n$ | TGA |
|---|---|---|---|---|---|
| 3 | $5 \times 10^{-6}$M | 1,020 | 2,110 | 2.07 | 99% |

EXAMPLE 4

The Use of Co(II)(DHIB-BF$_2$($_2$(H$_2$O)$_2$ as a Catalytic Chain Transfer Agent in the Free Radical Solution Polymerization of Methyl Methaorylate In a nitrogen drybox, 1000 ml of methyl methacrylate, which had been previously sparged with nitrogen and passed through a column of Woelm alumina (grade 1) was added to a 2000 ml round bottom flask. To this was added 4.2 mg of Co(II)(DHIB-BF$_2$)$_2$(H$_2$O)$_2$ catalyst, 2.90 g of 2,2-azobis(2-methyl)butanenitrile and 475 ml of methyl ethyl ketone. The round bottom flask was capped with a water cooled condenser, brought out of the drybox and heated to 65° C. under ntirogen for 17.5 hours. The reaction mixture was then allowed to cool to room temperature. The methyl methacrylate homomacromonomer produced was isolated with the General Procedure for solution polymerization was then conducted. The results are as follows.

| Example | Catalyst | $\overline{M}n$ | $\overline{M}w$ | $\overline{M}w/\overline{M}n$ | TGA |
|---|---|---|---|---|---|
| 4 | 1.0 ppm | 5,230 | 8,040 | 1.63 | 95% |

COMPARATIVE EXAMPLES E-F

Attempted Use of Co(II)(DHIB-H)$_2$(Ph$_3$P) and Co-(II)(DHIB-H)$_2$(C$_5$H$_5$N) as Catalystic Chain Transfer Agents in the Free Radical Solution Polymerization of Methyl Methacrylate

[Ph$_3$P=Triphenyl phosphine]

The General Procedure for solution polymerization was followed using the indicated type and amount of Co(II) catalyst. The results are listed below.

| Example | Catalyst | $\overline{M}n$ | $\overline{M}w$ | $\overline{M}w/\overline{M}n$ |
|---|---|---|---|---|
| E | Co(II)(DHIB-H)$_2$(Ph$_3$P) | 24,600 | 56,800 | 2.31 |
| F | Co(II)(DHIB-H)$_2$(C$_5$H$_5$N) | 39,500 | 82,100 | 2.08 |

EXAMPLES 5-7

The Use of Co(II)(DHIB-BF$_2$)$_2$(H$_2$O)$_2$ as a Catalystic Chain Transfer Agent in the Free Radical Solution Polymerization of Methyl Acrylate The General Procedure for solution polymerization was followed using the indicated amount of Co(II)(DHIB-BF$_2$)$_2$(H$_2$O)$_2$ as catalyst, methyl acrylate as monomer, 2,2'-azobis(isobutyronitrile) as initiator and methyl ethyl ketone as solvent. The cobalt catalyst was prepared according to the procedure described in Examples 1-2. The results are listed below.

| Example | Catalyst | $\overline{M}n$ | $\overline{M}w$ | $\overline{M}w/\overline{M}n$ |
|---|---|---|---|---|
| 5 | 5 × 10$^{-6}$M | 14,600 | 48,600 | 3.33 |
| 6 | 5 × 10$^{-5}$M | 7,700 | 23,300 | 3.03 |
| 7 | 5 × 10$^{-4}$M | 1,620 | 4,380 | 2.70 |

A repeat of the above experiment with no catalyst gave $\overline{M}n$ 17,300, $\overline{M}w$ 56,500 and $\overline{M}w/\overline{M}n$ 3.27.

EXAMPLES 8-10

The Use of Co(II)(DHIB-BF$_2$)$_2$(H$_2$O)$_2$ as a Catalytic Chain Transfer Agent in the Free Radical Solution Polymerization of Ethyl Acrylate The General Procedure for solution polymerization was followed using the indicated amount of Co(II)(DHIB-BF$_2$)$_2$(H$_2$O)$_2$ as catalyst, ethyl acrylate as monomer, 2,2'-azobis(isobutyronitrile) as initiator, and methyl ethyl ketone as solvent. The cobalt catalyst was prepared according to the procedure described in Examples 1-2. In the results listed below, [$\eta$] measured in dl/g is the intrinsic viscosity which is proportional to molecular weight. The higher the value of [$\eta$], the higher the molecular weight. These values were determined by capillary viscometry (CV).

| Example | Catalyst | $\overline{M}n$ | $\overline{M}w$ | $\overline{M}w/\overline{M}n$ | [$\eta$] |
|---|---|---|---|---|---|
| 8 | 5 × 10$^{-6}$M | 15,500 | 61,500 | 3.97 | 0.2151 |
| 9 | 5 × 10$^{-5}$M | 9,760 | 33,700 | 3.45 | 0.1509 |
| 10 | 5 × 10$^{-4}$M | 1,910 | 5,510 | 2.88 | 0.0556 |

A repeat of the above experiment with no catalyst gave $\overline{M}n$ 20,200, $\overline{M}w$ 70,500, $\overline{M}w/\overline{M}n$ 3.49, and [$\eta$] 0.2388

EXAMPLES 11-13

The Use of Co(II)(DHIB-BF$_2$)$_2$(H$_2$O)$_2$ as a Catalytic Chain Transfer Agent in the Free Radical Solution Polymerization of t-Butyl Acrylate Examples 8-10 were repeated using t-butyl acrylate as monomer. The results are listed below.

| Example | Catalyst | $\overline{M}n$ | $\overline{M}w$ | $\overline{M}w/\overline{M}n$ | [$\eta$] |
|---|---|---|---|---|---|
| 11 | 5 × 10$^{-6}$M | 15,000 | 71,100 | 4.75 | 0.2088 |
| 12 | 5 × 10$^{-5}$M | 14,100 | 58,600 | 4.16 | 0.1840 |
| 13 | 5 × 10$^{-4}$M | 4,400 | 12,300 | 2.81 | 0.0761 |

A repeat of the above experiment with no catalyst gave $\overline{M}n$ 16,000, $\overline{M}w$ 74,200, $\overline{M}w/\overline{M}n$ 4.64, and [$\eta$] 0.2122.

EXAMPLES 14-16

The Use of Co(II)(DHIB-BF$_2$)$_2$(H$_2$O)$_2$ as a Catalytic Chain Transfer Agent in the Free Radical Solution Polymerization of Vinyl Acetate The General Procedure for solution polymerization was followed using the indicated amount of Co(II)(DHIB-BF$_2$)$_2$(H$_2$)$_2$ as catalyst, vinyl acetate as monomer, 2,2'-azobis(isobutyronitrile) as initiator and methyl ethyl ketone as solvent. The cobalt catalyst was prepared according to the procedure described in Examples 1-2. The results are listed below.

| Example | Catalyst | $\overline{M}n$ | $\overline{M}w$ | $\overline{M}w/\overline{M}n$ |
|---|---|---|---|---|
| 14 | 5 × 10$^{-6}$M | 1,610 | 3,420 | 2.12 |
| 15 | 5 × 10$^{-5}$M | 1,660 | 3,510 | 2.11 |
| 16 | 5 × 10$^{-4}$M | 891 | 2,120 | 2.38 |

A repeat of the above experiment with no catalyst gave $\overline{M}n$ 1,660, $\overline{M}w$ 3,579 and $\overline{M}w/\overline{M}n$ 2.16.

EXAMPLES 17-19

The Use of $Co(II)(DHIB-BF_2)_2(H_2O)_2$ as a Catalytic Chain Transfer Agent in the Free Radical Solution Polymerization of Acrylonitrile The General Procedure for solution polymerization was followed using the indicated amount of $Co(II)(DHIB-BF_2)_2(H_2O)_2$ as catalyst, acrylonitrile as monomer, 2,2'-azobis(isobutyronitrile) as initiator and methyl ethyl ketone as solvent. The cobalt catalyst was prepared according to the procedure described in Examples 1-2. $[\eta]$ is defined in Examples 8-10.

| Example | Catalyst | $[\eta]$ |
|---|---|---|
| 17 | $5 \times 10^{-6}$M | 0.5465 |
| 18 | $5 \times 10^{-5}$M | 0.5410 |
| 19 | $5 \times 10^{-4}$M | 0.4483 |

A repeat of the above experiment with no catalyst gave $[\eta]$ 0.5533.

EXAMPLE 20

The Use of $Co(II)(DHIB-BF_2)_2(H_2O)_2$ as a Catalytic Chain Transfer Agent in the Free Radical Solution Polymerization of 2-Acrylamido-2-methylpropanesulfonic Acid The General Procedure for solution polymerization was followed using the indicated amount of $Co(II)(DHIB-BF_2)_2(H_2O)_2$ as catalyst, 0.1 mole 2-acrylamido-2-methylpropanesulfonic acid as monomer, $1.0 \times 10^{-3}$ moles of 2,2'-azobis(isobutyronitrile) as initiator and 100 ml of dimethylformamide as solvent. The cobalt catalyst was prepared according to the procedure described in Examples 1-2. The contents were heated at 100° C. under a nitrogen atmosphere for 90 minutes. The result, listed below, was determined by CV. $[\eta]$ is defined in Examples 8-10.

| Catalyst | $[\eta]$ |
|---|---|
| $5 \times 10^{-4}$M | 0.1150 |

A repeat of the above experiment with no catalyst gave $[\eta]$ 0.1525.

EXAMPLE 21

The Use of $Co(II)(DHIB-BF_2)_2(H_2O)$ as a Catalytic Chain Transfer Agent in the Free Radical Solution Polymerization of 2-Acrylamido-2-methylpropanesulfonic Acid The General Procedure for solution polymerization was followed using the indicated amount of $Co(II)(DHIB-BF_2)_2(H_2O)_2$ as catalyst, 0.1 mole of 2-acrylamido-2-methylpropanesulfonic acid as monomer, 0.374 g of 4,4'-azobis(4-cyanovaleric acid) as the initiator and 100 ml of water as solvent. The cobalt catalyst was prepared according to the procedure described in Examples 1-2. The contents were heated at 100° C. under a nitrogen atmosphere for 30 minutes. The result, listed below, was determined by CV. $[\eta]$ is in Examples 8-10.

| Catalyst | $[\eta]$ |
|---|---|
| $5 \times 10^{-4}$M | 0.5832 |

A repeat of the above experiment with no catalyst gave $[\eta]$ dl/g 0.8078.

EXAMPLES 22-23

The Use of $Co(II)(DHIB0BF_2)_2(H_2O)_2$ as a Catalytic Chain Transfer Agent in the Free Radical Emulsion Polymerization of Methyl Methacrylate The General Procedure for emulsion polymerization was followed using the indicated amount of $Co(II)(DHIB-BF_2)_2(H_2O)_2$ as catalyst and hexadecyltrimethylammonium bromide [0.025 M] as the cationic emulsifier. The cobalt catalyst was prepared according to the procedure described in Examples 1-2. The results are listed below.

| Example | Catalyst | $\overline{Mn}$ | $\overline{Mw}$ | $\overline{Mw}/\overline{Mn}$ |
|---|---|---|---|---|
| 22 | 0.25 ppm | 154,000 | 647,000 | 4.20 |
| 23 | 2.5 ppm | 20,000 | 44,900 | 2.25 |

A repeat of the above experiment with no catalyst gave $\overline{Mn}$ 368,000, $\overline{Mw}$ 3,655,000 and $\overline{Mw}/\overline{Mn}$ 9.93.

EXAMPLE 24

A. Preparation of $Co(II)(DDE-H)_2(H_2O)_2$ [DDE=1,2-diphenyl-1,2-dioxyiminoethane]

$Co(II)(DDE-H)_2(H_2O)_2$ was prepared by the method of G. N. Schrauzer, Inorg. Syn., 11, 64 (1968).

B. Preparation of $CO(II)DDE-BF_2)_2(H_2O)_2$

In a dry box, $Co(II)(DDE-H)_2(H_2O)_2$ [5.0 g], $BF_3 \cdot O(C_2H_5)_2$ [10.0 ml] and 100 ml $(C_2H_5)_2O$ were placed into a round bottom flask. The contents were stirred for 24 hours after which time the suspended solids were recovered by filtration and washed with diethyl ether. The recovered solids were dried under vacuum. Product yield=5.56 g.

C. The Use of $Co(II)(DDE-BF_2)_2(H_2O)_2$ as a Catalytic Chain Transfer Agent in the Free Radical Emulsion Polymerization of Methyl Methacrylate The General Procedure for emulsion polymerization was followed. The concentration of $Co(II)(DDE-BF_2)_2(H_2O)_2$ was 2.5 ppm. The resulting polymer had $\overline{Mn}$ 171,000, $\overline{Mw}$ 1,349,000 and $\overline{Mw}/\overline{Mn}$ 7.88.

EXAMPLE 25

A. Preparation of $Co(II)(DC-H)_2(H_2O)_2$ [DC=,2-dioxyiminocyclohexane]

$Co(II)(DC-H)_2(H_2O)_2$ was prepared by the method of G. N. Schrauzer, Inorg. Syn., 11, 64 (1968).

B. Preparation of $Co(II)(DC-BF_2)_2(H_2O)_2$

In a dry box, $Co(II)(DC-H)_2(H_2O)_2$ [5.0 g], $BF_3 \cdot O(C_2H_5)_2$ [10.0 ml]) and 100 ml of $(C_2H_5)_2O$ were placed into a round bottom flask. The contents were stirred for 24 hours after which time the suspended solids were recovered by filtration and washed with diethyl ether. The recovered solids were dried under vacuum. Product yield=4.09 g.

C. The Use of $Co(II)(DC-BF_2)_2(H_2O)_2$ as a Catalystic Chain Transfer Agent in the Free Radical Emulsion Polymerization of Methyl Methacrylate The General Procedure for emulsion polymerization was followed. The concentration of Co(II)(DC- $BF_2)_2(H_2O)_2$ was 2.5 ppm. The resulting polymer had $\overline{Mn}$ 14,500, $\overline{Mw}$ 31,500 and $\overline{Mw}/\overline{Mn}$ 2.17.

EXAMPLES 26-27

The Use of $Co(II)(DHIB-BF_2)_2(H_2O)_2$ as a Catalytic Chain Transfer Agent in the Free Radical Emulsion Polymerization of Methyl Methacrylate The General Procedure for emulsion polymerization was followed using the indicated amount of $Co(II)(DHIB-BF_2)_2(H_2O)_2$ as catalyst and 0.037 g of initiator. The cobalt catalyst was prepared according to the procedure described in Examples 1-3. The results are listed below.

| Example | Catalyst | $\overline{Mn}$ | $\overline{Mw}$ | $\overline{Mw}/\overline{Mn}$ | TGA |
|---|---|---|---|---|---|
| 26 | 2.5 ppm | 25,700 | 54,500 | 2.12 | 100% |
| 27 | 25 ppm | 1,260 | 3,280 | 2.61 | 100% |

A repeat of the above experiment with no catalyst gave $\overline{Mn}$ 2,926,000, $\overline{Mw}$ 7,002,000 and $\overline{Mw}/\overline{Mn}$ 2.39.

COMPARATIVE EXAMPLES G-I

Attempted Use of $Co(II)(DHIB-H)_2(H_2O)_2$, $KCo(CN)_5$ and $Co(II)Salen$ as Catalytic Chain Transfer Agents in the Free Radical Emulsion Polymerization of Methyl Methacrylate

[Salen = N,N'-bis(salicylidene)ethylenediamines]

The General Procedure for emulsion polymerization was followed using the indicated type and amount of Co(II) catalyst and hexadecyltrimethylammonium bromide [0.025 M] as the cationic emulsifier. The results are listed below.

| Example | Catalyst | $\overline{Mn}$ | $\overline{Mw}$ | $\overline{Mw}/\overline{Mn}$ |
|---|---|---|---|---|
| G | Co(II)(DHIB-H)$_2$(H$_2$O) [50 ppm] | 281,000 | 3,799,000 | 13.5 |
| H | Co(II)Salen [500 ppm] | 372,000 | 3,794,000 | 10.2 |
| I | K$_3$Co(CN)$_5$ [50 ppm] | 256,000 | 3,607,000 | 14.1 |

A repeat of the above experiment with no catalyst gave $\overline{Mn}$ 368,000, $\overline{Mw}$ 3,655,000, and $\overline{Mw}/\overline{Mn}$ 9.93.

INDUSTRIAL APPLICABILITY

The macromonomers of the present invention can be employed to produce graft polymers which are useful in coating and molding resins. Other potential uses can include cast, blown, spun or sprayed applications in fiber, film, sheet, composite materials, multilayer coatings, photopolymerizable materials, photoresists, surface active agents including soil repellants and physiologically active surfaces, adhesives, adhesion promoters and coupling agents, among others. End products taking advantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboards and traffic control devices, reprographic products and many others.

Using standard polymerization techniques, these graft polymers can be synthesized by reacting one or more macromonomers of the invention with one or more monomers having polymerizing compatibility with the macromonomers and with each other.

I claim:

1. A composition comprising: at least about 85 mol % of a macromonomer having
   (I) an end group of the formula $CH_2=C(X_3)(CH_2)$; and
   (II) at least 50 and up to about 10,000 monomeric units linked to the end group, said units being independently selected from a compound of the fomula $+CH_2C(R_4)(R_5)+$;
   wherein $X_3$ is $CO_2J$;
   wherein each $R_4$ and $R_5$ are $CO_2J$ and $CH_3$, provided that when $R_4$ is $CO_2J$, $R_5$ is $CH_3$ and when $R_5$ is $CO_2J$, $R_4$ is $CH_3$; and
   wherein each J is independently $C_1$ to $C_{12}$ alkyl, allyl, glycidyl, hydroxyalkyl, allyloxyethyl, 2,4-hexadienyl or dialkylaminoalkyl;
   provided that each monomeric unit has polymerizing compatibility with any adjacent monomeric unit.
2. The composition of claim 1 wherein the number of monomeric units is at least 50 and up to about 1,000.
3. The composition of claim 2 wherein the number of monomeric units is at least 100 and up to about 500.
4. The composition of claim 1 wherein J is $CH_3$.
5. The composition of claim 1 wherein the macromonomer comprises at least about 90 mol %.
6. The composition of claim 5 wherein the macromonomer comprises at least about 95 mol %.
7. The composition of claim 4 wherien the macromonomer comprises at least about 90 mol %.
8. The composition of claim 7 wherein the macromonomer comprises at least about 95 mol %.

* * * * *